United States Patent [19]

Ohba et al.

[11] 4,274,113

[45] Jun. 16, 1981

[54] SOLID-STATE IMAGING DEVICE

[75] Inventors: Shinya Ohba, Kokubunji; Shuhei Tanaka, Higashiyamato; Masaharu Kubo, Hachioji; Haruhisa Ando, Kokubunji; Yataro Yamashita, Hachioji; Shoji Hanamura, Kokubunji; Masakazu Aoki, Hachioji; Masaaki Nakai, Kodaira, all of Japan

[73] Assignee: Hitachi, Ltd., Tokyo, Japan

[21] Appl. No.: 118,743

[22] Filed: Feb. 5, 1980

[30] Foreign Application Priority Data

Feb. 7, 1979 [JP] Japan .................................. 54-12248

[51] Int. Cl.³ .......................... H04N 3/12; H04N 3/14
[52] U.S. Cl. ................................... 358/212; 358/213; 250/211 J

[58] Field of Search ....................... 358/212, 294, 213; 250/208, 209, 211 J; 357/30; 307/311

[56] References Cited

FOREIGN PATENT DOCUMENTS 54-27313  3/1979 Japan .

Primary Examiner—John C. Martin
Attorney, Agent, or Firm—Craig & Antonelli

[57] ABSTRACT

A solid-state imaging device which is horizontally scanned by a discontinuous scanning pulse train, wherein an output signal of the device is integrated by a signal processing circuit which comprises an emitter follower (source follower) circuit and a capacitor disposed in parallel with the emitter follower (source follower) circuit, whereby noise components are canceled so as to derive only a video signal. With this solid-state imaging device, fixed pattern noise can be eliminated, and a good picture quality can be achieved.

11 Claims, 26 Drawing Figures

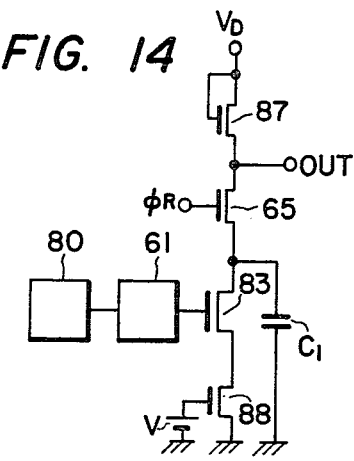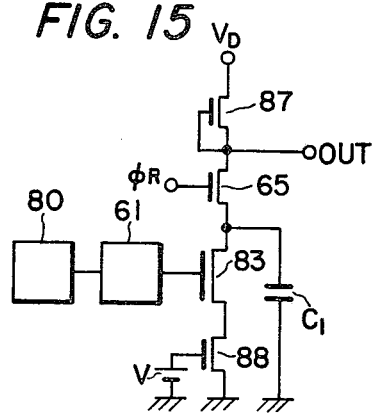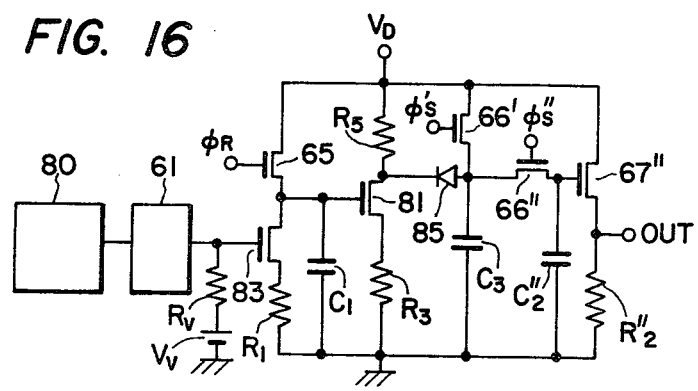

SOLID-STATE IMAGING DEVICE

BACKGROUND OF THE INVENTION (1) Field of the Invention

This invention relates to a solid-state imaging device which reads out photo information stored in a plurality of photodiodes arrayed in one dimension or two dimensions in the surface region of a semiconductor body. More particularly, it relates to improvements in a signal processing circuit of the solid-state imaging device.

(2) Description of the Prior Art

The construction of a prior-art solid-state imaging device is schematically shown in FIG. 1A.

FIG. 1A illustrates an example of the principle construction of a solid-state area sensor (imaging device), while FIG. 1B illustrates an example of a pulse timing chart of horizontal scanning pulses and vertical scanning pulses. In FIG. 1A, numerals 1 and 2 designate horizontal and vertical scanning circuits respectively. By applying clock pulses $CP_x$ and $CP_y$ ordinarily of two to four phases, the respective scanning circuits supply output lines of their stages 7 and 8 or lines $O_{x(1)}$, $O_{x(2)}$ ... and $O_{y(1)}$, $O_{y(2)}$ ... with output pulses $V_{ox(1)}$, $V_{ox(2)}$ ... and $V_{oy(1)}$, $V_{oy(2)}$ ... shown in FIG. 1B into which input pulses $V_{sx}$ and $V_{sy}$ have been shifted by fixed timing intervals of the corresponding clocks. Using the output pulses, switching elements 5 and 6 are turned "on" and "off" one by one, to fetch at a video output terminal 4 signals from individual photoelectric conversion elements 3 arrayed in two dimensions. Since the signals from the photoelectric conversion elements correspond to an optical image of an object projected on these elements, video signals can be fetched by the above operation.

In order to attain a high resolution, the solid-state imaging device of this type requires photoelectric conversion elements and switching elements in numbers of about 500×500 and scanning circuits each having a plurality of stages. Therefore, it is usually fabricated by the use of the MOS-VLSI technology with which a high packaging density is realized comparatively easily and with which the photoelectric conversion element and the switching element can be formed as a unitary structure. FIG. 2 shows the structure of a picture element which occupies most of the area of a sensor IC. Numeral 13 designates a semiconductor body (such as semiconductor substrate, epitaxial grown layer and well diffused region) of one conductivity type. Numerals 5 and 6 designate switching elements, respectively, which are made of insulated-gate field effect transistors (hereinbelow, termed "MOS transistors") for addressing horizontal and vertical positions. They are constructed of diffused layers 14, 15 and 16 having the opposite conductivity type to that of the body 13 and forming drains and sources, and gate electrodes 18 and 19 disposed through an insulating film 17. The layer 14 also constitutes a photodiode which utilizes the source of the MOS transistor 6 serving as the vertical switching element. Charges in a quantity having been discharged in proportion to incident photons are given from a voltage source for a video output 11 into the diode 14 in a position in which output pulses $V_{ox(N)}$ and $V_{oy(N)}$ of respective scanning circuits 1 and 2 utilizing, for example, shift registers made up of MOS transistors are simultaneously applied to the gates of the switching MOS transistors through output lines $O_{x(N)}$ and $O_{y(N)}$ of the scanning circuits. A charging current at that time is read out from a signal output terminal 4 through a load resistance 12 as a video signal.

With such prior-art device, however, fixed pattern noise occur due to a cause to be stated below and form a fatal drawback of the photosensor.

FIG. 3A depicts the structure of FIG. 2 more simply. Numeral 13 designates a semiconductor body, for example, Si body of the P-type conductivity, and numeral 14 one photodiode which is formed of a diffusion layer of the N+-type conductivity. A region 15 corresponds to the vertical signal output line 9 shown in FIG. 1A, and a region 16 to the horizontal signal output line 10 shown in FIG. 1A. The region 15 in FIG. 3A may well be divided into two regions of the drain of a MOS transistor 6 and the source of a MOS transistor 5, the subregions being connected with a metal such as aluminum.

FIGS. 3B to 3F illustrate channel potentials corresponding to FIG. 3A. Now that the N channel type devices are considered, the potential has its plus direction taken downwards.

In the state of FIG. 3B, signal charges 31 are stored in the photodiode 14, and 0 (zero) V is applied to the gate 18 of the vertical switching MOS transistor (hereinbelow, abbreviated to "VTr") 6 and the gate 19 of the horizontal switching MOS transistor (hereinbelow, abbreviated to "HTr") 5, so that both the transistors are "off".

FIG. 3C shows the state in which the VTr 6 turns "on", and the signal charges spread underneath the gate 18 of the VTr 6 and into the vertical signal output line 15. FIG. 3D illustrates the potentials at the time when the HTr 5 is also turned "on", and the signal charges are spreading also into the horizontal signal output line 16 and are being delivered therefrom. FIG. 3E illustrates the state in which the signal charges have been once read out, and the respective potentials have been reset to $V_o$. In FIG. 3F, the HTr 5 turns "off", and the signal of the next picture element is being read out.

As understood from FIGS. 3E and 3F, some 32 of the signal charges are left under the gate 19 of the horizontal switching MOS transistor HTr 5, and they are delivered from under the gate to the horizontal output line 16 when the horizontal scanning pulse turns "off".

FIG. 4A shows a shift register which consists of inverters 41 and transfer gates 42 and which has heretofore been well known.

The shift register in FIG. 4A is a prior-art example of a horizontal scanning circuit. As illustrated in a pulse timing chart of FIG. 4B, in the prior-art device, the time at which the n-th horizontal scanning pulse $V_{ox(n)}$ turns "off" and the time at which the ensuing (n+1)-th horizontal scanning pulse $V_{ox(n+1)}$ turns "on" are determined by the same trigger pulse of a horizontal clock pulse $\overline{\phi}_{x2}$.

More specifically, the time at which the horizontal scanning pulse $V_{ox(n+1)}$ turns "on" is the time at which the signal of the (n+1)-th column is provided, and it is also the time at which the horizontal scanning pulse $V_{ox(n)}$ of the n-th column turns "off". In sum, in the prior-art device, as seen from FIGS. 3E and 3F, some $Q_R$ 32 of the signal charges of the photodiode of the n-th column having been trapped under the gate 19 of the horizontal switching MOS transistor 5 of the n-th column are delivered at the time when the signal of the photodiode of the (n+1)-th column is delivered. If the residual charges $Q_R$ are equal in all the columns, there will be no problem. However, when they are unequal, they form one cause for the fixed pattern noise.

As a result, normal video signals are not obtained in the solid-state imaging device, and vertical stripes appear on a reproduced picture screen, which spoils the picture quality seriously.

SUMMARY OF THE INVENTION

This invention has for its object to improve the disadvantage of the prior-art solid-state imaging device described above, and to provide a solid-state imaging device comprising a signal processing circuit which eliminates the fixed pattern noise ascribable to the residual charges.

The solid-state imaging device of this invention is a device which employs a discontinuous scanning pulse train (pulse train having intervals) for horizontal scanning pulses. Further, it is a device which includes a signal processing circuit adapted to integrate the output signals of a sensor portion by the use of an emitter follower circuit (source follower circuit).

BRIEF DESCRIPTION OF THE DRAWINGS

FIGS. 8, 9, 10, 11, 12, 13, 14, 15, 16, 17 and 18 are circuit diagrams each showing an embodiment of a signal processing circuit of a solid-state imaging device according to this invention.

DETAILED DESCRIPTION OF THE INVENTION

In order to eliminate the problem of the prior art stated above and to achieve an enhancement in the performance of the solid-state imaging device, Oba et al. of the inventors have previously proposed a scanning system wherein the horizontal scanning pulse $V_{ox(n)}$ of the n-th column is turned "off" before the horizontal scanning pulse $V_{ox(n+1)}$ of the (n+1)-th column is turned "on" to read the signal of the (n+1)-th column (Japanese laid-open patent application No. 27313/1979, laid open Mar. 1, 1979).

Hereunder, this scanning system will be described.

Figure 1A:
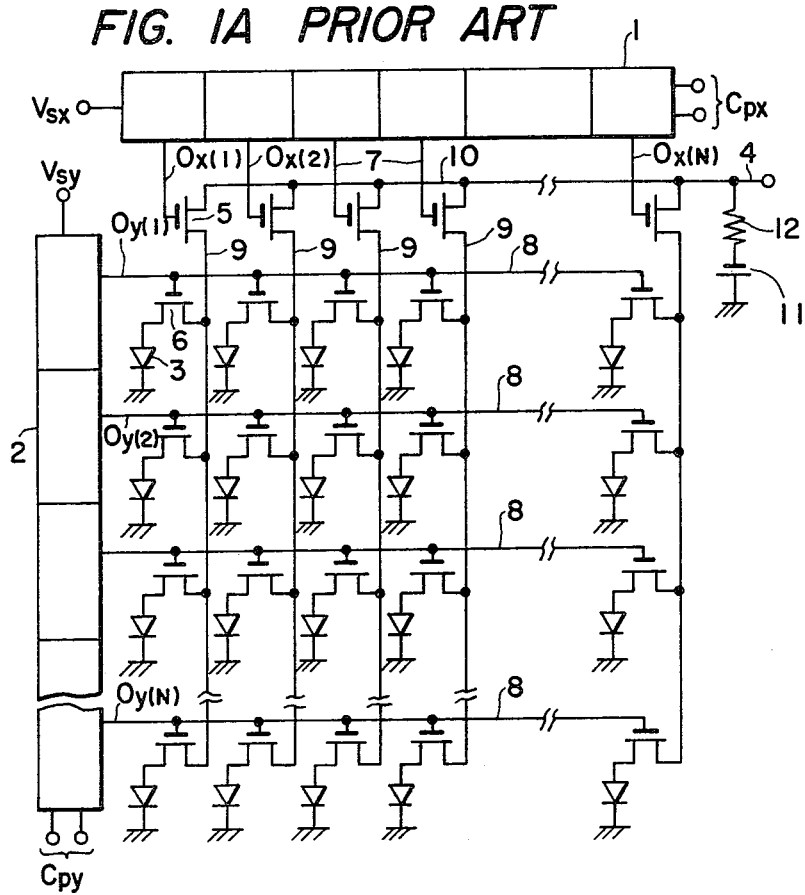
FIG. 1A is a schematic circuit diagram showing the outline of a solid-state imaging device.
Figure 1B:
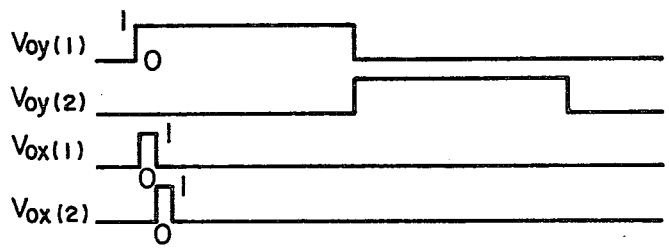
FIG. 1B is a pulse timing chart showing vertical scanning pulses $V_{oy(N)}$ and horizontal scanning pulses $V_{ox(N)}$ which are employed in the solid-state imaging device of FIG. 1A.
Figure 2:
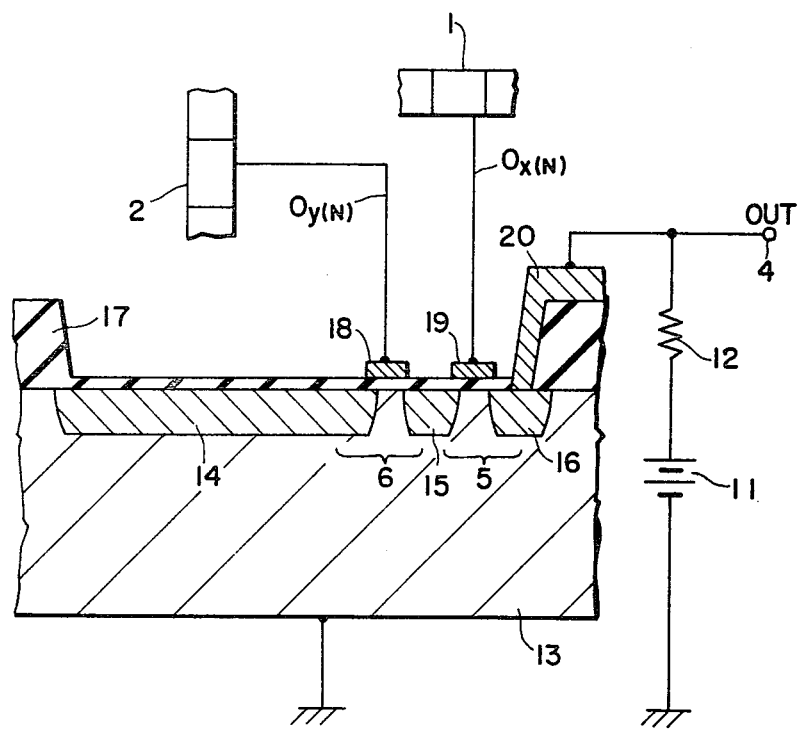
FIG. 2 is a sectional view showing the picture element structure of the solid-state imaging device.
Figure 3A:
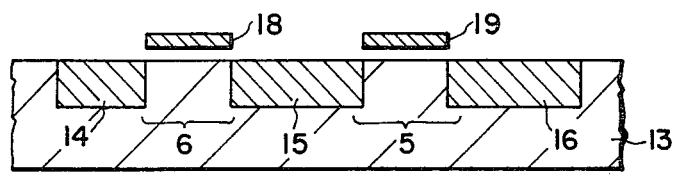
FIG. 3A is a conceptual view of the picture element construction of the solid-state imaging device showing the arrayal among a photodiode, a vertical switching MOS transistor and a horizontal switching MOS transistor.
Figure 3B:
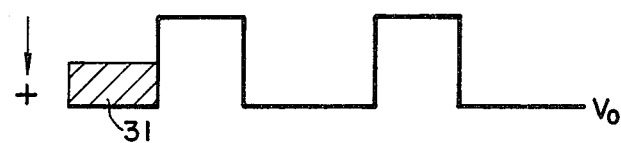
FIGS. 3B, 3C, 3D, 3E and 3F are conceptual diagrams for explaining the movements of signal charges in the picture element portion of the solid-state imaging device.
Figure 3C:
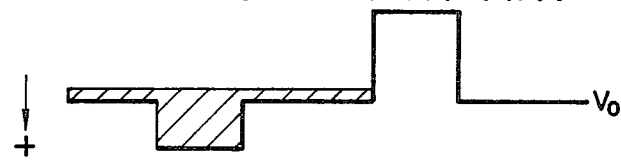
Figure 3D:
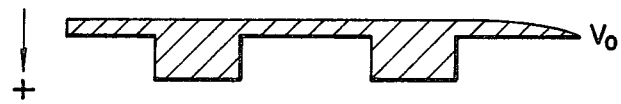
Figure 3E:
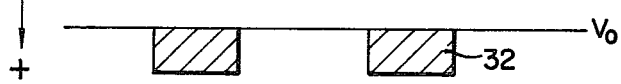
Figure 3F:
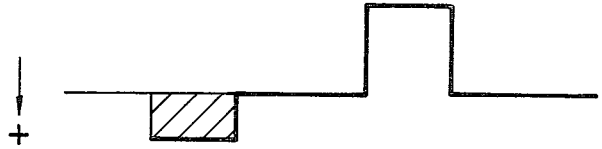
Figure 4A:
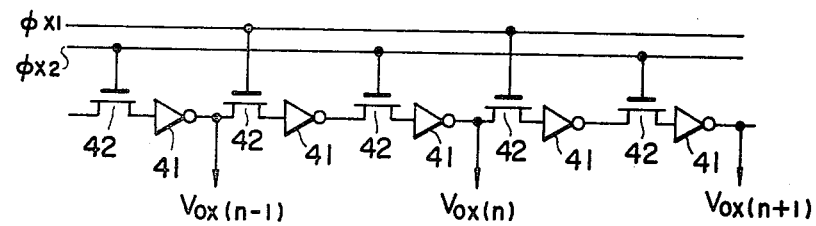
FIG. 4A is a schematic circuit diagram showing a scanning circuit in the solid-state imaging device.
Figure 4B:
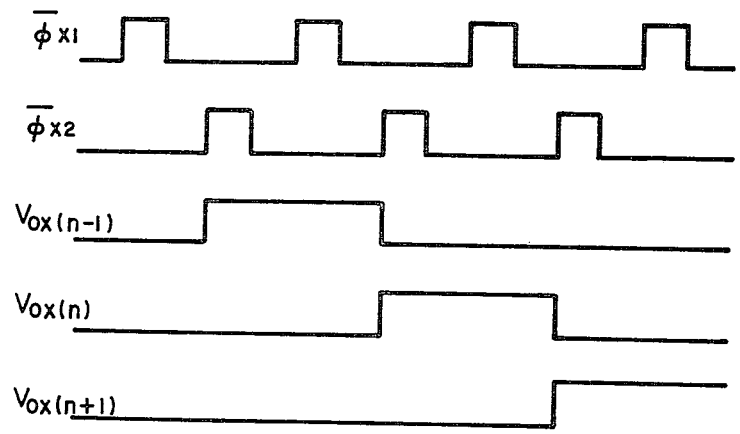
FIG. 4B is a pulse timing chart showing input and output pulses of the scanning circuit of FIG. 4A.
Figure 5A:
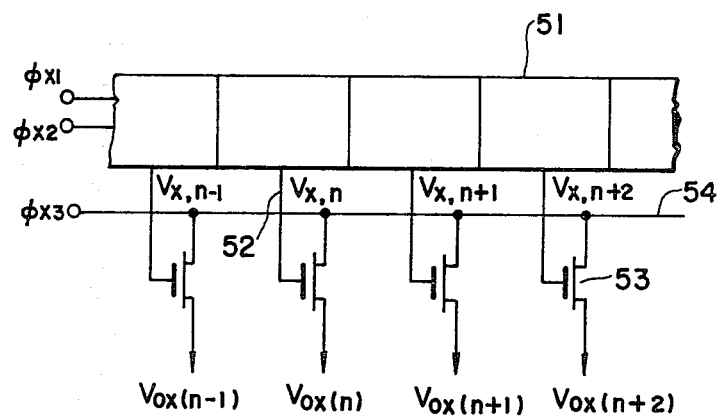
FIG. 5A is a schematic circuit diagram showing a scanning circuit which generates a discontinuous scanning pulse train.
Figure 5B:
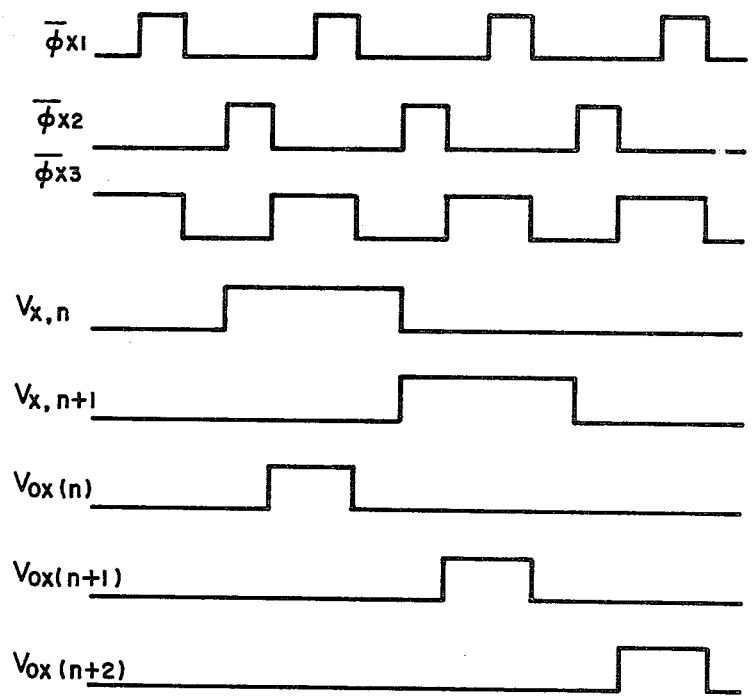
FIG. 5B is a pulse timing chart showing input and output pulses of the scanning circuit of FIG. 5A.

In FIG. 5A, numeral 51 designates a shift register as shown in FIG. 4A by way of example. Pulses $V_{x,m}$ as shown by $V_{x,n}$ and $V_{x,n+1}$ in FIG. 5B are provided at output lines 52 of the shift register. According to the scanning circuit of this example, separate gate transistors 53 are disposed between the output lines 52 of the shift register and switching MOS transistors, and pulses $V_{ox(m)}$ to be impressed on the gates of the switching MOS transistors are controlled by clock pulses $\overline{\phi_{x3}}$ which are impressed on a drain line 54 of the gate transistors 53.

The output pulses $V_{ox(m)}$ of the scanning circuit shown in FIG. 5A have pulse widths equal to time intervals during which the ANDs between the output pulses $V_{x,m}$ of the shift register and the clock pulses $\overline{\phi_{x3}}$ hold. That is, they become a train of pulses as shown at $V_{ox(n)}$, $V_{ox(n+1)}$ ... in FIG. 5B.

In this example, the output pulses become the pulse train having intervals (interspaces) or the discontinuous pulse train in which after the pulse $V_{ox(n)}$ has turned "off" the pulse $V_{ox(n+1)}$ turns "on" with an interval therebetween.

In case where, in the example of FIGS. 5A and 5B, $$V_{SH} - V_{th} \geqq V_{XH}$$

is held among the high level voltage $V_{XH}$ of the clock pulse $\overline{\phi_{x3}}$, the high level $V_{SH}$ of the output pulse of the shift register 51 and the threshold voltage $V_{th}$ of the gate transistor (MOS transistor) 53, the gate transistor comes to operate in the non-saturation region. That is, it is possible to make uniform the output waveforms, especially output signal amplitudes, of the outputs $V_{ox(m)}$ of the scanning circuit as shown at $V_{ox(n)}$, $V_{ox(n+1)}$, ... in FIG. 5B, and the effect of the present scanning system is more enhanced.

The signal read-out time interval becomes the pulse width of the output pulse $V_{ox(m)}$, i.e., the width of the clock pulse $\overline{\phi_{x3}}$, and it is also possible to appropriately adjust this width.

In the signal processing circuit of the solid-state imaging device containing therein the scanning circuit whose horizontal scanning pulse train consists of the discontinuous pulses as stated previously, in order to prevent the fixed pattern noise; noise 70 (refer to FIG. 7) ascribable to the displacement currents of pulses of sensor outputs ($V_2$ in FIG. 7) based on the discontinuous scanning pulses are integrated and then canceled, and only desired signals 71 are taken out.

Figure 6:
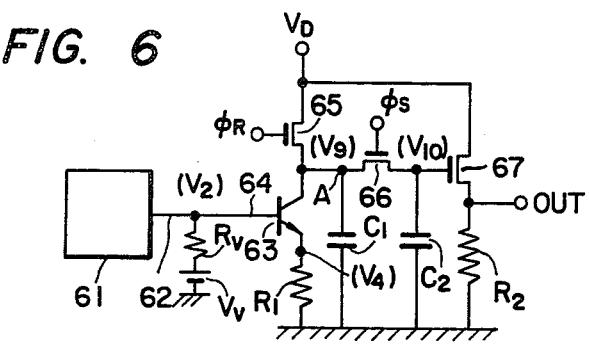
FIG. 6 is a circuit diagram showing the arrangement of a signal processing circuit which employs an emitter follower circuit.

FIG. 6 shows a signal read-out circuit which has previously been proposed by Oba et al. of the inventors (Japanese laid-open utility model registration application No. 155426/1979, laid open Oct. 29, 1979). Numeral 61 designates a sensor portion of a solid-state linear or area sensor as formed of MOS transistors, numeral 62 a horizontal signal output line, and numeral 64 a video output line. Symbol $V_V$ indicates a voltage source for a video output (video voltage), and symbol $V_D$ a voltage supply terminal. Symbol $\phi_R$ denotes an input terminal of reset pulses $\phi_R$, symbol $\phi_S$ an input terminal of sampling pulses $\phi_S$, and OUT a signal output terminal.

In FIG. 6, an NPN transistor 63 and a resistance $R_1$ construct an emitter follower circuit. An emitter voltage $V_4$ is related to a base voltage $V_2$ as follows:

$$V_4 = V_2 - V_{bi} \quad (1)$$

Here, $V_{bi}$ denotes a built-in voltage.

A current i which flows through the resistance $R_1$ is expressed by:

$$i = V_4/R_1 = (V_2 - V_{bi})/R_1 \quad (2)$$

Using this current, a capacitance $C_1$ is discharged to perform the integration. Letting $t_1$ denote the time interval during which a reset transistor 65 (here, a MOS transistor is utilized) is turned "off" by the reset pulse $\overline{\phi_R}$, a collector voltage $V_9$ immediately before the reset transistor 65 turns "on" becomes:

$$V_9 = \frac{1}{C_1 R_1} \int_0^{t_i} (V_2 - V_{bi}) dt \quad (3)$$

Thus, the output voltage $V_2$ of the sensor is integrated, the integrated output $V_9$ appears at a point A, so that the noise can be eliminated. In the figure, a capacitance $C_2$ is a mere parasitic capacitance, but the capacitance $C_1$ is a capacitance intentionally incorporated (parasitic capacitance or additional capacitance). As understood from Expression (3), $V_9$ is determined by the magnitudes of $R_1$ and $C_1$. In the example of FIG. 6, it is desirable to hold the following relation:

$$C_1 >> C_2$$

Figure 7:
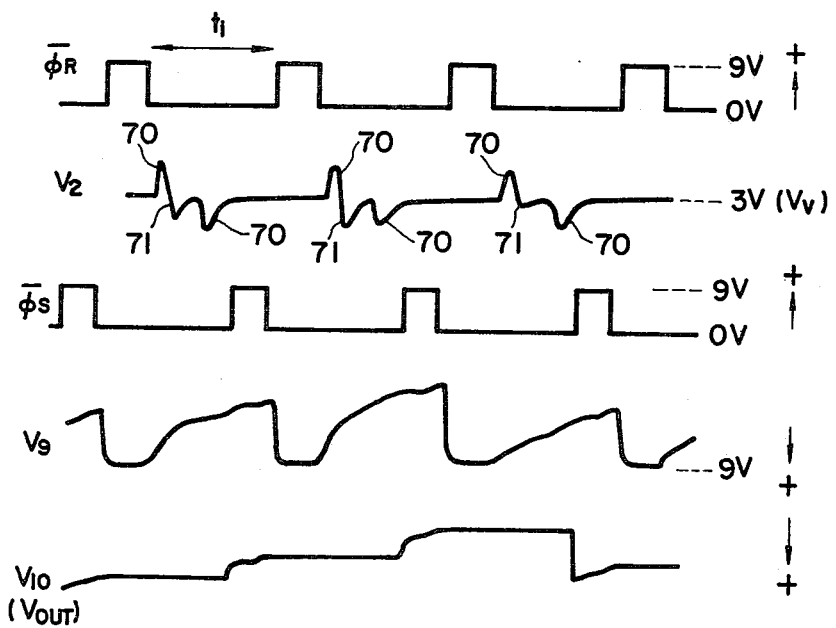
FIG. 7 is a timing chart for explaining the operation of the signal processing circuit of FIG. 6.

FIG. 7 shows a time chart of the pulses and voltages $\overline{\phi_R}$, $V_2$, $\overline{\phi_S}$, $V_9$ and $V_{10}$ (or OUT terminal voltage $V_{OUT}$). While the voltages of $V_D$, $\overline{\phi_R}$ and $\overline{\phi_S}$ in the circuit of FIG. 6 can be ordinarily made 5–12 V, they are now made 9 V and the video voltage $V_V$ is made 3 V in the illustration of the voltage values in FIG. 7.

In FIG. 6, numeral 66 indicates a transistor (here, a MOS transistor) for sampling and holding the output obtained, and numeral 67 a buffer transistor (here, a MOS transistor).

However, the circuit of FIG. 6 has turned out to be yet imperfect as the signal processing circuit of the solid-state imaging device employing the discontinuous horizontal scanning pulse train stated previously.

That is, the signal processing circuit shown in FIG. 6 has the disadvantage that when the sampling pulse $\overline{\phi_S}$ is impressed, the signal is shared with the parasitic capacitance $C_2$ and changes.

Figure 8:
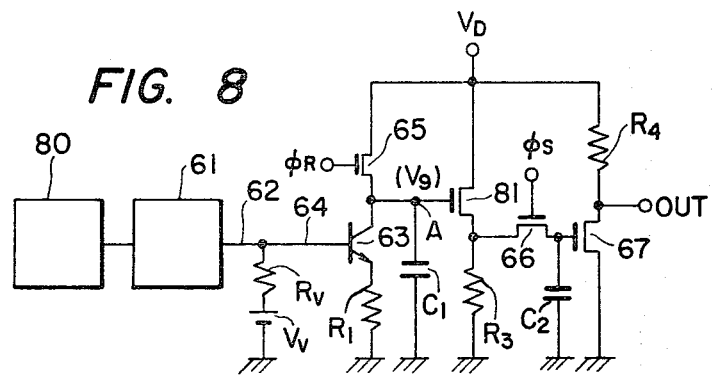

FIG. 8 shows an embodiment of this invention. The embodiment of FIG. 8 is such that a source follower circuit (constructed of a MOS transistor 81 and a resistance $R_3$) is inserted between the point A, at which the integrated output $V_9$ appears, and the sampling transistor 66 in FIG. 6. Thus, in the signal processing circuit of FIG. 8, the potential $V_9$ of the integration output terminal A is not affected by the parasitic capacitance $C_2$ even when the sampling pulse $\overline{\phi_S}$ is applied.

Figure 9:
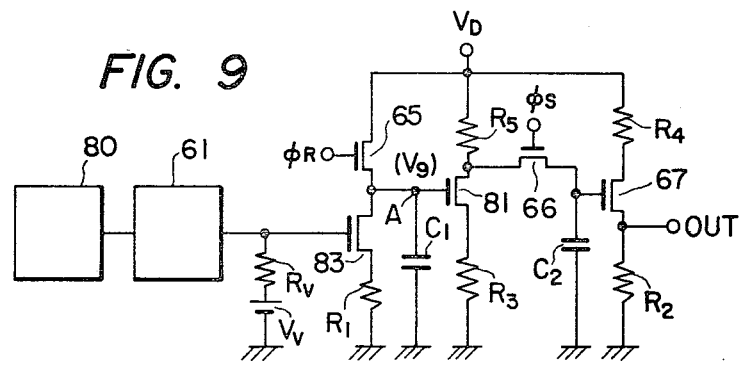

In an embodiment of FIG. 9, as the transistor of the first stage, an N channel type MOS transistor 83 is substituted for the NPN bipolar transistor. The effect of the invention is the same as in the embodiment of FIG. 8.

Figure 10:
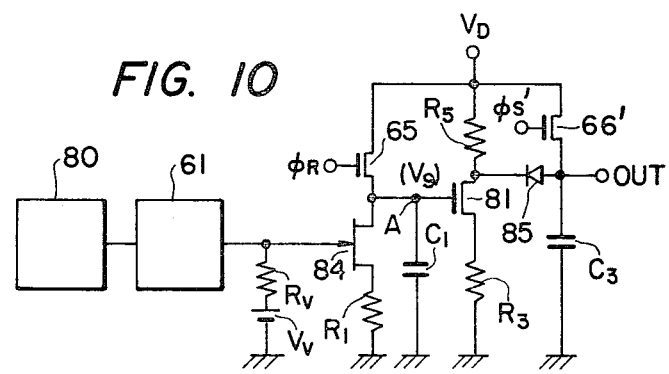

In an embodiment of FIG. 10, a junction FET (J-FET) 84 is used as the transistor of the first stage, and the integrated output is peak-detected through a source follower.

Figure 11:
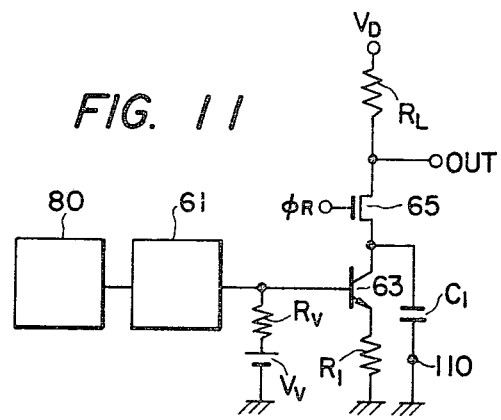

In the above embodiments, the sampling pulses $\overline{\phi_S}$ or $\overline{\phi_S}'$ are required. In contrast, another embodiment shown in FIG. 11 does not require the sampling pulses, and it is easier of use. In FIG. 11, the reset pulse is impressed to charge the capacitance $C_1$. A current flowing in at that time is detected through a load resistance $R_L$. More specifically, a current corresponding to the integration value of a current which has flowed out from the capacitance $C_1$ through the resistance $R_1$ in the time interval from a resetting to the next resetting flows into the capacitance $C_1$ at the resetting, and it is detected through the load resistance $R_L$. Accordingly, the sampling pulses are dispensed with.

Figure 12:
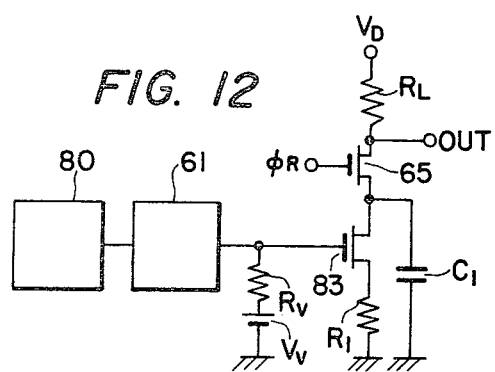
Figure 13:
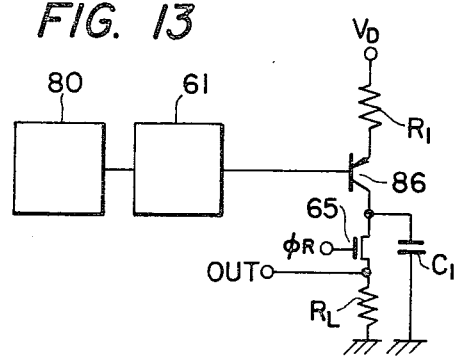

FIG. 12 shows an embodiment in which a MOS transistor 83 is used as the transistor of the first stage, while FIG. 13 shows an embodiment in which a PNP transistor 86 is employed to invert the polarities. FIGS. 14 and 15 show embodiments in which, in order to facilitate the fabrication in the form of integrated circuits, the resistances are constructed of MOS transistors 87, 87' and 88.

Figure 17:
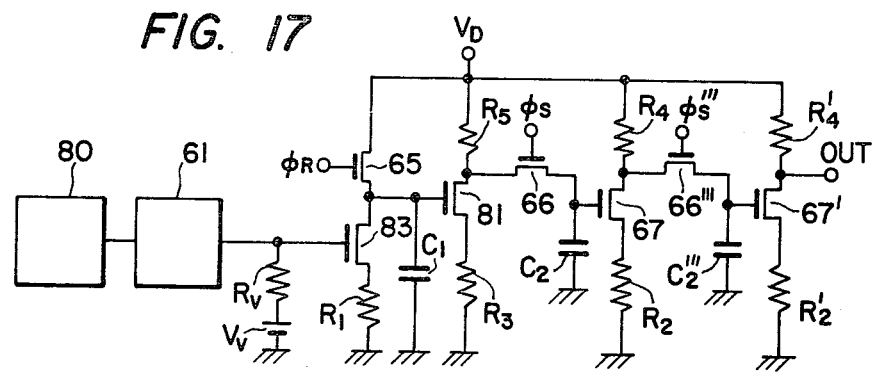

In FIGS. 16 and 17, the output signals provided by the circuits of FIGS. 10 and 9 are respectively subjected to the double sampling, thereby intending to obtain signals with the fixed pattern noise reduced more. In these embodiments, two sampling pulse trains ($\phi_S'$ and $\phi_S''$ in FIG. 16, and $\phi_S$ and $\phi_S'''$ in FIG. 17) become necessary unpreferably. However, as compared with the case of the single sampling pulse train, they are advantageous in that both the phase and the speed can be easily set.

Figure 18:
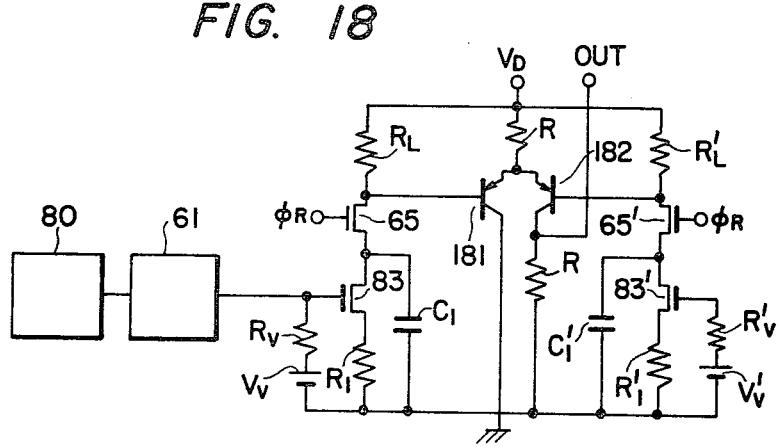

An embodiment in FIG. 18 is such that the sensor is coupled to only one of two circuits, and it consists in an output detecting method of the differential type based on a differential amplifier which employs transistors 181 and 182.

In the embodiments described above, numeral 80 indicates a drive circuit for the sensor portion of the solid-state imaging device, and numeral 61 the sensor portion of the solid-state imaging device. In this invention, the output signal of the sensor portion is directly processed. The output from the terminal OUT is further passed through a low-pass filter, and then amplified by an amplifier, the amplified signal becoming an output signal. In this regard, it is of course possible and causes no hindrance to dispose an amplifier behind the sensor portion and to apply the present invention to the amplified output waveform.

The various embodiments may well be combined, for example, into the construction of FIG. 18 in which the embodiments of FIGS. 8 and 11 are put into the differential form.

Hereunder, various symbols in FIGS. 8 to 16 are explained.

61 . . . sensor portion of the solid-state imaging device, 63, 181, 182 . . . bipolar transistors, 83, 81, 87, 88 . . . MOS transistors, $R_1$, $R_2$, $R_3$, $R_4$, $R_5$, $R_2'$, $R_2''$, $R_4'$, $R_L$, $R_L'$, $R_V$, $R_V'$ . . . resistances, $C_1$, $C_2$, $C_1'$, $C_2''$, $C_2'''$ . . . capacitances (capacitors, parasitic capacitances, etc.), $\phi_R$, $\phi_{R1}$, $\phi_{R2}$ . . . reset pulse terminals, $\phi_S$, $\phi_S'$, $\phi_S''$, $\phi_S'''$ . . . sampling pulse terminals, 66, 66', 66'', 66''' . . . sampling and holding transistors (MOS transistors), 67, 67', 67'' . . . buffer transistors (MOS transistors), 65, 65' . . . reset transistors (MOS transistors), 85 . . . diode, $V_D$ . . . supply voltage terminal, V . . . D.C. bias source, OUT . . . signal output terminal.

What is claimed is:

1. In a solid-state imaging device having a sensor portion which reads out photo information stored in a plurality of photodiodes disposed in a surface region of a semiconductor body, with a discontinuous horizontal scanning pulse train, and a signal processing circuit which integrates and eliminates noise components of video signals provided from said sensor portion; a solid-state imaging device characterized in that said signal processing circuit comprises a first emitter (source) follower circuit in which a first transistor receiving the video signals and a first load are connected in series, a second transistor which is connected in series with said first emitter (source) follower circuit and which receives a reset signal, a capacitance which is connected between a collector of said first transistor and a ground terminal, and a second emitter (source) follower circuit which receives a collector (drain) output of said first transistor and which detects an integration value of a discharge current of said capacitance.

2. A solid-state imaging device according to claim 1, wherein said first transistor is a bipolar transistor.

3. A solid-state imaging device according to claim 1, wherein said first transistor is a field-effect transistor.

4. A solid-state imaging device according to claim 1, wherein said signal processing circuit further comprises a third transistor which samples and holds the output of said second emitter (source) follower circuit, and a sampling pulse is impressed on said third transistor.

5. A solid-state imaging device according to claim 1, wherein said signal processing circuit further comprises a peak detector circuit which samples and holds a peak value of the output of said second emitter (source) follower circuit.

6. A solid-state imaging device according to claim 4 or claim 5, wherein the output sampled and held is passed through a low-pass filter and is thereafter amplified by an amplifier into an output signal.

7. In a solid-state imaging device having a sensor portion which reads out photo information stored in a plurality of photodiodes disposed in a surface region of a semiconductor body, with discontinuous horizontal scanning pulses, and a signal processing circuit which integrates and eliminates noise components of video signals provided from said sensor portion; a solid-state imaging device characterized in that said signal processing circuit comprises a first emitter (source) follower circuit in which a first transistor receiving video signals and a first load are connected in series, a second transistor which is connected in series with said first emitter (source) follower circuit and which receives a reset signal, a capacitance which is connected between a collector of said first transistor and a ground terminal, and a second load which is connected in series with said second transistor and which detects an integration value of a discharge current of said capacitance.

8. A solid-state imaging device according to claim 7, wherein said first transistor is a bipolar transistor.

9. A solid-state imaging device according to claim 7, wherein said first transistor is a field-effect transistor.

10. A semiconductor device according to claim 7, wherein said signal processing circuit further comprises a differential amplifier which differentially amplifies the detected output.

11. A solid-state imaging device according to claim 7, wherein the detected output is passed through a low-pass filter and is thereafter amplified by an amplifier into an output signal.

* * * * *

UNITED STATES PATENT AND TRADEMARK OFFICE
CERTIFICATE OF CORRECTION

PATENT NO. : 4,274,113
DATED : June 16, 1981
INVENTOR(S) : Shinya Ohba et al.

It is certified that error appears in the above—identified patent and that said Letters Patent is hereby corrected as shown below:

On the title page, Assignee should read:

-- Hitachi, Ltd. and Hitachi Denshi Kabushiki Kaisha --.

Signed and Sealed this

Second Day of March 1982

[SEAL]

Attest:

Attesting Officer

GERALD J. MOSSINGHOFF

Commissioner of Patents and Trademarks